Figure 1:
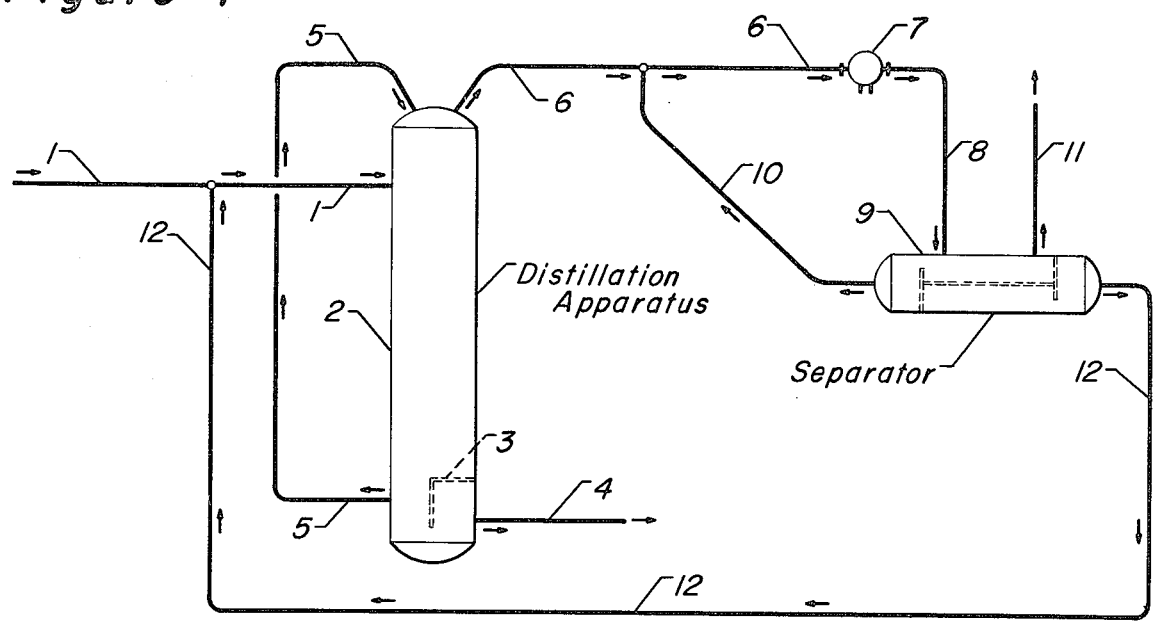

United States Patent [19]

Hausler

[11] B 3,923,606

[45] Dec. 2, 1975

[54] PREVENTION OF CORROSION

[75] Inventor: Rudolf H. Hausler, Palatine, Ill.

[73] Assignee: Universal Oil Products Company, Des Plaines, Ill.

[22] Filed: Feb. 26, 1973

[21] Appl. No.: 336,129

[44] Published under the Trial Voluntary Protest Program on January 28, 1975 as document no. B 336,129.

[52] U.S. Cl. .................. 203/7; 203/10; 203/59; 55/70; 55/73; 252/8.55 E; 252/390
[51] Int. Cl.² .................. B01D 3/34; C23F 14/00
[58] Field of Search .............. 203/7, 10, 11, 12, 13, 203/61, 68, 58, 59; 159/DIG. 13; 208/47, 187, 358, 348; 21/2.5, 2.7; 55/70, 73, 68

[56] References Cited
UNITED STATES PATENTS

| | | | |
|---|---|---|---|
| 2,668,748 | 2/1954 | Asbury | 55/73 |
| 2,908,640 | 10/1959 | Dougherty | 208/47 X |
| 3,189,537 | 6/1965 | Carlton | 208/47 |
| 3,394,055 | 7/1968 | Ludwig | 203/10 |
| 3,676,327 | 7/1972 | Foroulis | 203/7 |
| 3,689,238 | 9/1972 | Stedman | 203/7 |
| 3,754,376 | 8/1973 | Kent | 55/70 |
| 3,766,053 | 10/1973 | Seffens | 208/47 |

*Primary Examiner*—Norman Yudkoff
*Assistant Examiner*—David Edwards
*Attorney, Agent, or Firm*—James R. Hoatson, Jr.; Raymond H. Nelson; William H. Page, II

[57] ABSTRACT

The prevention of corrosion in a distillation apparatus used to strip gases from an aqueous medium is effected by the simultaneous circulation of two hydrocarbon streams which contain inhibitors dissolved therein, one of said streams being circulated through the apparatus while the other is circulated through an overhead line, heat exchange and separation means.

7 Claims, 2 Drawing Figures

PREVENTION OF CORROSION

BACKGROUND OF THE INVENTION

Process waters in the petroleum industry such as those used in refineries contain various gases which, when combined with the aqueous medium in which they are entrained, will corrode certain pieces of refinery apparatus. These refinery waters which contain the corrosion-producing gases are generally referred to as sour water. Examples of these corrosive gases which may be present will include hydrogen sulfide, ammonia, or ammonia in forms of ammonium sulfate, ammonium thiosulfide as well as phenols and cyanides, the main corrosive agent being hydrogen sulfide. In addition, many sour water streams also contain varying amounts of oxygen which greatly accelerates the rate of corrosion of the apparatus. Furthermore, there is also the possibility that some dissolved solids may be present and it has been found that a high concentration of corrosive gases in combination with a solid such as ammonium chloride leads to crevice corrosion and/or underscale corrosion, particularly in places where solids of this kind can deposit without being washed away by sufficient water.

The problem of inhibiting corrosion in sour water strippers or in similar systems such as, for example, the manufacture of heavy water based on a hydrogen sulfide-deuterium sulfide exchange has been one of attempting to fine a water soluble inhibitor which operates at such low concentrations that it does not constitute an additional pollution problem. In addition, for ecological reasons, the gases cannot simply be discarded. Success in attempting to find a water-soluble inhibitor which will operate at a low concentration has not been achieved nor have attempts to solve the problem by the utilization of corrosion-proof metallurgy been successful due to the extremely high cost of the apparatus.

This invention relates to a process for preventing the corrosion of various apparatus which are used in distillation. More specifically the invention is concerned with a process for preventing the corrosion of distillation apparatus which are used to strip gases from an aqueous medium containing corrosion-producing gases.

As hereinbefore set forth, when various aqueous media containing contaminants such as corrosion-producing gases are to be treated, it is necessary to protect the equipment which is being used from corroding. For example, when process units such as sour water strippers are to be used, the gases which are present in said sour water such as ammonia and/or hydrogen sulfide are stripped out and, in the case of ammonia, used again or, in the case of hydrogen sulfide, are processed to form elemental sulfur.

It is therefore an object of this invention to provide a method for preventing the corrosion of distillation apparatus which are utilized in the distillation of aqueous media containing contaminants which may lead to corrosion of the equipment.

A further object of this invention is to provide a method for preventing corrosion in sour water strippers by the utilization of a hydrocarbon stream containing an inhibitor dissolved therein.

In one aspect an embodiment of this invention resides in a method for the prevention of corrosion in a distillation apparatus provided with heat exchange and separation means used to strip gases from an aqueous medium containing entrained corrosion-producing gases which comprises the simultaneous circulation of two inhibitor-containing hydrocarbon streams, one of said streams entering the top portion of said apparatus, contacting the structural elements of said apparatus while in concurrent downward flow with said aqueous medium, said aqueous medium being stripped of said entrained gases during said downward flow to produce a lean aqueous phase and an overhead vapor stream containing said gases and water, separating said hydrocarbon stream from said lean aqueous phase and recirculating said hydrocarbon stream to the top portion of said apparatus, contacting said overhead vapor stream with the other of said inhibitor-containing hydrocarbon streams, flowing said hydrocarbon stream concurrently with said vapor stream through heat exchange means to separation means, separating the gases from said hydrocarbon stream and water, and recirculating said hydrocarbon stream to contact said overhead vapor stream.

A specific embodiment of this invention is found in a method for the prevention of corrosion in distillation apparatus provided with heat exchange and separation means which is used to strip gases from an aqueous medium containing entrained corrosion-producing gases which comprises the simultaneous circulation of two kerosene streams containing an inhibitor comprising a salt of an acid and an amine, one of said kerosene streams entering the top portion of the apparatus, contacting the structural elements of the apparatus while in concurrent downward flow with said medium, said aqueous medium being stripped of hydrogen sulfide and ammonia during said downward flow to produce a lean aqueous phase and an overhead vapor stream containing said ammonia, hydrogen sulfide and water, separating said kerosene stream from said lean aqueous phase and recirculating said kerosene stream to the top portion of said apparatus, contacting said overhead vapor stream with the other of said kerosene streams containing an inhibitor comprising a salt of an acid and an amine, flowing said kerosene stream concurrently with said vapor stream through heat exchange means to separation means, separating the hydrogen sulfide and ammonia from said kerosene stream and water, and recirculating said kerosene stream to contact said overhead vapor stream.

Other objects and embodiments will be found in the following further detailed description of the present invention.

As hereinbefore set forth the present invention is concerned with a process for preventing the corrosion in a distillation apparatus which is used to strip corrosion-producing gases from an aqueous medium, the process being effected by the continuous recirculation of two separate inhibitor-containing hydrocarbon streams. By utilizing an inhibitor which is oil soluble but not water soluble, it is possible to recirculate the stripped or clean water to the process inasmuch as said water will not contain any of the inhibitor. In the event that the water contains some hydrocarbon stream, it is not harmful and, when utilized in a reflux line, may even be desired. Furthermore, by utilizing an oil-soluble inhibitor rather than a water-soluble inhibitor, it is possible to maintain the inhibitor in place rather than having it circulate all through the refinery as would be the case if said inhibitor were water soluble. In addition, it may also be possible to utilize much larger concentrations of inhibitor than is customarily used in certain systems such as crude towers. It is contemplated within the scope of this invention that the inhibitor which is utilized may be in a range of from about 5 to about 1,000 parts per million of the hydrocarbon stream, the amount of inhibitor which is used being dependent upon the emulsification properties of the inhibitor. The type of oil-soluble inhibitor which is to be utilized in the process of this invention may be any inhibitor which is known in the art. For example, such inhibitors may comprise a salt of a dimer type acid and oleylamine which is dissolved in a petroleum solvent, a salt of an aliphatic acid phosphate and a polyamine dissolved in a petroleum solvent, a salt of a dimer type acid and a hydrogenated diamine dissolved in a petroleum solvent, an aliphatic polyamine, a polymeric condensation product of an epihalohydrin and a hydrogenated aliphatic amine, an imidazoline, etc. It is to be understood that these compounds are only representative of the type of inhibitors which may be employed, and that the present invention is not necessarily limited thereto.

In addition the hydrocarbon stream which contains the inhibitor and which is continuously recirculated in two separate streams, one through the distillation apparatus and the other through the overhead and separation means, may comprise any hydrocarbon containing a relatively high boiling point and which is not volatile at the temperature which is utilized to strip the corrosion-producing gases from the aqueous medium. For example, the stripping of the corrosion-producing gases from the aqueous medium is usually effected at temperatures in the range of from about 175° to about 225° C. and usually at about 200° C. Therefore, it is incumbent to utilize hydrocarbons which possess boiling points greater than about 225° C. and preferably greater than about 250° C. For purposes of economics it is contemplated that a particularly useful hydrocarbon stream which may be utilized comprises kerosene which normally has a boiling point of about 250° C., although other hydrocarbons may also be utilized.

The novel method of the present invention will be more readily understood if explained in conjunction with the attached drawings which schematically illustrate two embodiments of the invention. Referring now to FIG. 1 which illustrates one embodiment of the invention, the feed comprising an aqueous medium containing corrosion-producing gases such as hydrogen sulfide, ammonium sulfide, ammonium sulfate, ammonia, etc., is charged through line 1 to a distillation apparatus 2 which is provided with conventional structural distillation means such as plates, baffles, etc., and which is also provided with means 3 to separate the stripped or lean aqueous phase from the hydrocarbon phase. In addition, the distillation apparatus will also contain a predetermined amount of a hydrocarbon such as kerosene containing an inhibitor of the type hereinbefore set forth in greater detail. The distillation apparatus is maintained at a temperature in the range of from about 175° to about 225° C. by means of heaters which are not shown in the drawing. The amount of hydrocarbon which is present during the operation may range from about 1% to about 10% of the total throughput of the aqueous medium. The aqueous medium containing the corrosion-producing gases flows in a downward path through distillation apparatus 2 while in contact with one portion of the inhibitor-containing hydrocarbon. As the mixture passes through said distillation apparatus 2, all of the structural elements of the apparatus are contacted by the mixture comprising the aqueous medium and the hydrocarbon stream. While passing through apparatus 2 the corrosion-producing gases are stripped from the aqueous medium thus resulting in a mixture toward the bottom of apparatus 2 of the inhibitor-containing hydrocarbon and a stripped or lean aqueous phase. At the bottom of the apparatus 2 the hydrocarbon and the aqueous phase are separated by any conventional means such as a weir. The stripped or clean aqueous phase is withdrawn from the bottom portion of apparatus 2 through line 4 and recycled for further use in the desired operation such as a refinery, heavy water producing plant, etc. The inhibitor-containing hydrocarbon is withdrawn from another bottom portion of apparatus 2 through line 5 and recycled to the top portion of apparatus 2 for downward flow and admixture with the aqueous medium which contains the corrosion-producing gases. The corrosion-producing gases of the type hereinbefore set forth which have been stripped from the water are withdrawn as an overhead vapor stream from apparatus 2 through line 6 and passed through heat exchange means 7 and line 8 to a separator tank 9. After withdrawal from apparatus 2 and prior to entry into heat exchange means 7, the gases plus some water vapors which may be present are contacted with a second recirculation stream of inhibitor-containing hydrocarbon which has been withdrawn from separator tank 9 through line 10. Thus, an admixture of inhibitor-containing hydrocarbon and an overhead vapor stream containing the gases and water after cooling by means of passage through heat exchanger 7 are separated in separator tank 9. The gases are removed from separator tank 9 through line 11 and further treated, if so desired, by conversion to elemental sulfur or reuse as ammonia. The water which has been condensed by passage through heat exchange means 7 along with any entrained corrosion-producing gases which may still be present in the water are removed from separator tank 9 through line 12 and recycled to feed line 1 for further treatment.

Figure 2:
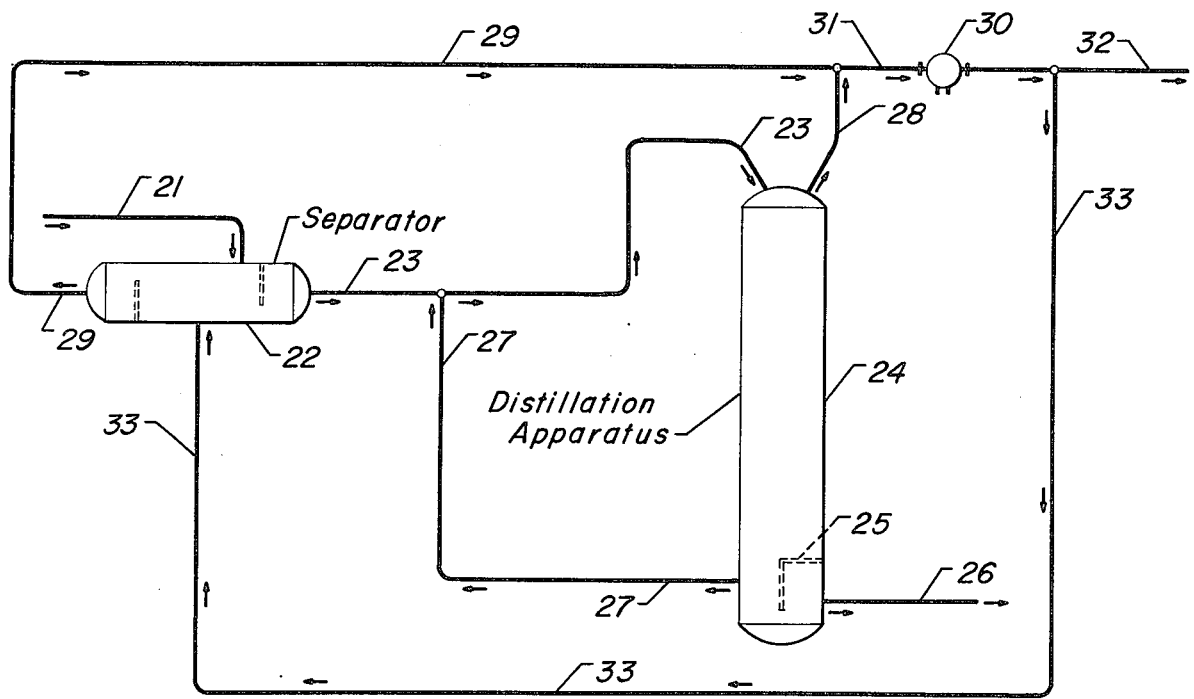

Referring now to FIG. 2 which illustrates a second embodiment of the present invention in which corrosion in a distillation apparatus may be prevented, a feed stock comprising an aqueous medium containing corrosion-producing gases of the type hereinbefore set forth is charged through line 21 to a separator tank 22. In this tank the aqueous feed is admixed with an inhibitor-containing hydrocarbon of the type hereinbefore set forth and charged through line 23 to a top portion of distillation apparatus 24 which is provided with structural elements not shown, such as plates, baffles, etc., wherein the entrained corrosion-producing gases are stipped from the aqueous medium. As in the case of FIG. 1 above the distillation apparatus is maintained at the desired temperature by heat means not shown in the present drawing. At the bottom portion of apparatus 24, the mixture of inhibitor-containing hydrocarbon and lean or stripped water is separated by conventional means 25 such as a weir. The stripped or cleaned water is withdrawn from apparatus 24 through line 26 and reused in the refinery while the inhibitor-containing hydrocarbon stream is withdrawn through line 27 and admixed with the feed from separator tank 22 in line 23, the recirculated stream being charged to the top portion of apparatus 24. The overhead vapor stream comprising the corrosion-producing gases and some water were withdrawn from apparatus 24 through line 28 where it is admixed with an inhibitor-containing hydrocarbon stream which has been withdrawn from separator tank 22 through line 29. The mixture of inhibitor-containing hydrocarbon and overhead vapor stream is passed to a heat exchanger 30 through line 31 wherein the gases are withdrawn through line 32. Any water vapor which may still contain entrained corrosion-producing gases along with the inhibitor-containing hydrocarbon stream are passed through line 33 back to the separator tank 22. In separator tank 22 the water containing the corrosion-producing gases is admixed with the fresh feed also containing the corrosion-producing gases and passed through line 23 into distillation apparatus 24.

It is to be understood that the aforementioned methods of effecting the process of the present invention are only representative of said processes and that various modifications may be made to the method of the present invention in accordance with the above disclosure. Such modifications, however, are to be considered as being within the scope of this invention.

The following example is given as an illustration of one embodiment in which the method of the present invention may be effected. However, as hereinbefore set forth, it is only given as an illustration and is not intended to limit the generally broad scope of the present invention in strict accordance therewith.

EXAMPLE

A feed stream of 200 gallons per minute of water which contains hydrogen sulfide and ammonia entrained therein is charged to a distillation apparatus which is maintained at a temperature of 230° C., said feed stock being charged at an upper portion of the apparatus. The water is contacted with a hydrocarbon stream comprising kerosene containing a salt of a dimer acid and oleylamine as an inhibitor. The kerosene is recirculated through the distillation apparatus in an amount of 20 gallons per minute, the amount of inhibitor contained in the kerosene being at a level of 100 parts per million of kerosene. The mixture of the water and kerosene flows downwardly through the distillation apparatus while contacting the structural elements of the apparatus which comprises distillation plates. After flowing downward through the distillation apparatus, the mixture of kerosene and water is separated at the bottom of the distillation apparatus by means of a weir. The water which has been stripped of entrained hydrogen sulfide and ammonia is withdrawn through a line provided therefor and recirculated back to the refinery system while the kerosene containing the inhibitor is withdrawn from another section of the bottom portion of the apparatus and recirculated to the top portion thereof. The hydrogen sulfide and ammonia which have been stripped from the water are withdrawn in an overhead line from a top portion of the distillation apparatus along with some water vapor. The overhead vapor stream is contacted with a second stream of kerosene containing the inhibitor comprising the salt of a dimer acid and oleylamine while passing through the overhead line to heat exchange means. In the heat exchange means a cooling is effected whereby the overhead stream is cooled to a temperature of 115° C. and charged to a separator tank. In the separator tank the hydrogen sulfide and ammonia gases are withdrawn overhead and disposed of while the kerosene containing the inhibitor is withdrawn and recirculated to the overhead line. The water which has condensed due to the passage through the cooling means is withdrawn from the separator tank and recycled to form a portion of the feed stock which is passed through the distillation apparatus.

I claim as my invention:

1. A method for the prevention of corrosion in a distillation apparatus provided with heat exchange and separation means used to strip gases from an aqueous medium consisting essentially of water containing entrained corrosion-producing gases which comprises the simultaneous circulation of two inhibitor-containing hydrocarbon streams, one of said streams entering the top portion of said apparatus, contacting the structural elements of said apparatus while in concurrent, downward flow with said aqueous medium, said aqueous medium being stripped of said entrained gases during said downward flow to produce a lean aqueous phase and an overhead vapor stream containing said gases and water, separating said hydrocarbon stream from said lean aqueous phase and recirculating said hydrocarbon stream to the top portion of said apparatus, contacting said overhead vapor stream with the other of said inhibitor-containing hydrocarbon streams, flowing said hydrocarbon stream concurrently with said vapor stream through heat exchange means to separation means, separating the gases from said hydrocarbon stream and water, and recirculating said hydrocarbon stream to contact said overhead vapor stream.

2. The method as set forth in claim 1 in which said hydrocarbon possesses a boiling point in excess of 250° C.

3. The method as set forth in claim 1 in which said hydrocarbon is kerosene.

4. The method as set forth in claim 1 in which said inhibitor in said hydrocarbon comprises a salt of an acid and an amine.

5. The method as set forth in claim 1 in which said inhibitor in said hydrocarbon is an imidazoline.

6. The method as set forth in claim 1 in which said corrosion-producing gas is hydrogen sulfide.

7. The method as set forth in claim 1 in which said corrosion-producing gas is ammonia.

* * * * *